United States Patent Office 3,092,604
Patented June 4, 1963

---

3,092,604
CURABLE RESIN SYSTEM, CURED EPOXY RESIN, AND PROCESS OF FORMING THE SAME
Harold H. Levine, La Jolla, Calif., assignor to Narmco Industries, Inc., San Diego, Calif., a corporation of California
No Drawing. Filed Aug. 14, 1961, Ser. No. 131,086
14 Claims. (Cl. 260—37)

This invention relates to new and useful curable epoxy resin systems, to the process of producing a novel cured epoxy resin and to the product obtained thereby.

In recent years epoxy resin systems have been widely utilized as adhesives, coatings and the like. While the epoxy resin may be polymerized to an infusible mass by heating the resin sufficiently, such systems conventionally include a curing agent to speed polymerization and to reduce the temperature necessary to effect the same.

These curing agents may be either in the form of a catalyst or more conventionally may be an organic compound which enters into a polymerization reaction with the oxirane moieties found in all epoxy resins. Typical curing agents of this type are dicyandiamide, diamino diphenyl sulfone and the like. Such conventional curing agents are used to produce epoxy resin adhesive systems and in general such adhesives have relatively high bond strength and moderate temperature resistivity.

Recently, efforts have been made to increase the heat stability of epoxy resin systems. In such cases the conventional curing agents have proved to be unsatisfactory in that the cured resin systems do not retain strength at temperatures above, for example, 500° F. for any length of time.

One group of curing agents which has been found suitable for use in epoxy resin systems to obtain a temperature resistant cured resin are the amphoteric oxides. These curing agents have been described in the application of Susman et al., No. 794,407, filed February 19, 1959, now U.S. Patent No. 3,014,893 entitled Cured Epoxy Resin Material. It is there disclosed that arsenic pentoxide, for example, may be used to cure epoxy resins and the resulting products have substantially improved temperature stability at, for example, 500° F.

While such amphoteric oxides, and particularly arsenic pentoxide, have proven to be satisfactory curing agents, the use of such materials in epoxy resin systems has certain disadvantages. For example, at even moderate curing temperatures the polymerization of the resin proceeds with such rapidity that frothing is readily apparent and when the resin is to be used as an adhesive, voids may be formed which reduce the bonding strength of the cured resin. Further, the pot life of the mixture of resin and arsenic pentoxide is relatively short, substantial polymerization occurring at temperatures below 150° F.

It is, therefore, an object of the present invention to provide a curable epoxy resin system suitable for use in high temperature applications which overcomes these disadvantages.

It is a further object of the present invention to provide a curable epoxy resin system which is relatively stable at room temperature and which may be formed into a temperature resistant polymerized epoxy resin.

It is a further object of the present invention to provide a curable epoxy resin system having substantially improved oxidation resistance when utilized as a putty or coating.

It is a further object of the present invention to provide a novel cured epoxy resin system which is harder and more dense than such systems previously known.

It is a more particular object of the present invention to provide a cured epoxy resin system which has substantial thermal stability at temperatures in excess of 900° F.

It is a further object of the present invention to provide a process of forming such a cured epoxy resin system.

Other objects and advantages of the present invention will be apparent to those skilled in the art from the following detailed description of the preferred embodiments thereof.

The epoxy resin system which is the subject of the present invention includes a mixture of an epoxy resin and arsenic trisulfide as a curing agent.

In the application of Susman et al., referred to above, it was shown that amphoteric oxides gave new and improved properties to epoxy resins upon curing. It was then believed that arsenic pentoxide, for example, reacted with the epoxy resin to give a new composition of matter. It is now known that the arsenic pentoxide acts essentially as a catalyst, taking no part in the reaction, per se. The mechanism for the reaction when arsenic pentoxide is used as the curing agent may be illustrated as follows:

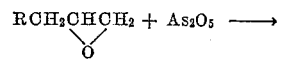

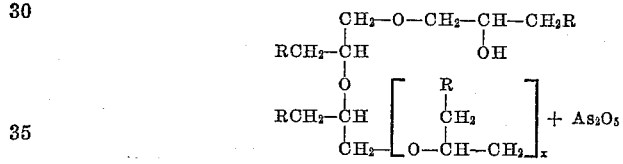

It is seen that there is obtained by this reaction a plurality of polyethers terminated with hydroxyl groups, and that the arsenic pentoxide takes no part in the reaction, thus acting as a true catalyst.

When arsenic trisulfide is substituted for arsenic pentoxide in the reaction scheme, the following reaction is obtained:

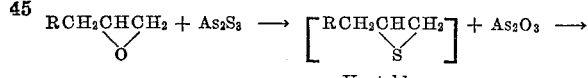

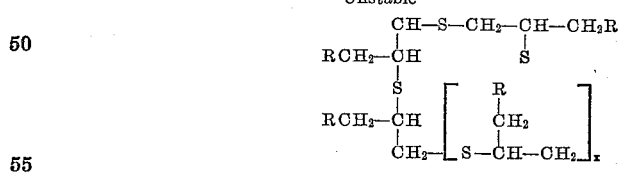

The intermediate compound set forth above has not been chemically proven since, as indicated, it is unstable, but it has been shown that there is obtained the polythioether which is terminated with mercaptan groups. The thioether linkage has been demonstrated by reacting the resulting compound with hydrogen peroxide and acetic acid. It is thus seen that the use of arsenic trisulfide as a curing agent results in fact in a new composition of matter and from the above reaction scheme it will be seen that this curing agent is applicable to epoxy resins generally.

Such resins are any of those classes of polyepoxides containing an average of more than one oxirane group per molecule wherein the polyepoxide is composed of the elements carbon, hydrogen and oxygen, having oxygen in any or all of the groups selected from the group consisting of OH, —COO—, ethereal oxygen and oxirane groups.

The amount of curing agent to be used with the epoxy resin should be in the range of from 10 to 35 parts by weight curing agent per 100 parts by weight resin. If too little curing agent is used in this reaction scheme, an incomplete cure is achieved, since unlike systems wherein the curing agent acts as a catalyst, the arsenic trisulfide actually takes part in the reaction. If more than approximately 35 parts per 100 parts resin is used, the strength of the resulting cured resin system is reduced.

As a model compound, 1,2-epoxy dodecane,

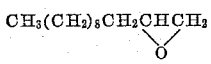

was treated with arsenic trisulfide to illustrate the reaction of the latter with the oxirane moiety found in epoxy resins. The reaction was carried out as follows:

A mixture consisting of 70 parts of 1,2-epoxy dodecane and 7.0 parts of arsenic trisulfide (yellow-technical grade) was prepared in a 3-neck flask fitted with a reflux condenser connected to a Dry Ice trap, a sealed stirrer and inner thermometer. Heat was applied and the mixture stirred. At 135° C., darkening occurred and after 60 minutes at 230° C., the arsenic trisulfide was essentially all dissolved and the reaction mixture was dark brown in color. The reaction mixture was cooled to 110° C. and an additional 14.0 parts of arsenic trisulfide added. Heat was re-applied and after 90 minutes at between 200°–260° C., a slight exothermic reaction occurred and the heat source removed. At all temperatures above 110° C. during the reaction, a slight amount of hydrogen sulfide was detectable.

After standing overnight, the reaction mixture was filtered to yield a light brown filter cake and a dark brown filtrate. The filter cake was recrystallized from 200 ml. of methanol to give a white solid with a melting point of 81°–82° C. Distillation of the filtrate gave some 1,2-epoxy dodecane, $N_D^{26}$ 1.435 which was identical to a sample of the starting material and an infra-red spectrum identical to that of the 1,2-epoxy dodecane used in the reaction. The yield of 1,2-epoxy dodecane recovered indicated that 72.1 percent of the dodecane had reacted.

An infra-red spectrum of the white solid, M.P. 81°–82° C., showed some hydroxyl groups present at 2.8–3.0μ. When a sample of the white solid was oxidized by refluxing with a mixture of hydrogen peroxide in glacial acetic acid, a new substance was obtained. On re-crystallization from methanol this now had a melting point of 195°–258° C. (with decomposition). Infra-red analysis of this new substance exhibited strong absorptions at 7.65–7.80μ and 8.80–9.10μ. These absorptions are characteristic of the sulfone group,

This showed that the original solid melting at 81°–82° C. contained the thioether linkage, —S—. The broad melting range appeared to be due to a mixture of sulfones and sulfoxides

because the infra-red spectrum showed a sulfoxide absorption at 9.43–9.71μ. This sulfoxide is an intermediate in the oxidation of a thioether to a sulfone and probably resulted from incomplete oxidation.

The reaction of hydrogen peroxide in acetic acid with the thioether linkage may be illustrated as follows:

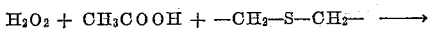

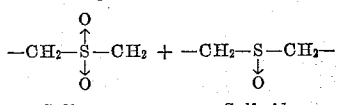

One high temperature epoxy resin system which has recently been developed includes a mixture of an epoxy resin, a silicone-phenolic condensation product, a curing agent and aluminum powder. Previously, arsenic pentoxide has been used as the curing agent in such a system and the resulting adhesive showed excellent temperature characteristics at temperatures of approximately 500° F. However, in such systems, when the temperature was raised to between approximately 975° F.–1000° F. a violent exothermic reaction occurred which immediately destroyed the adhesive bond. In contrast, when arsenic trisulfide was substituted for arsenic pentoxide as the curing agent, no such exothermic reaction occurred and substantial tensile shear strength was obtained after exposure to a temperature of 1000° F. for as long as ten minutes.

The following is a specific example of such an adhesive composition (all proportions in the examples being in parts by weight):

EXAMPLE I 100.0 parts epoxy novolak
30.5 parts silicone-phenolic (87.5% solids)
10.0 parts arsenic trisulfide
127.6 parts aluminum powder were thoroughly mixed together. The epoxy novolak, having the structure

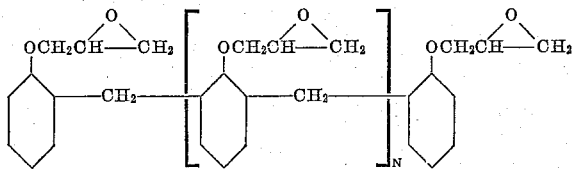

where N=2–10, was prepared from a novolak prepared by the acid catalyzed condensation of an excess of phenol with formaldehyde, which in turn was reacted with epichlorohydrin.

The silicone-phenolic, having the theoretical structure

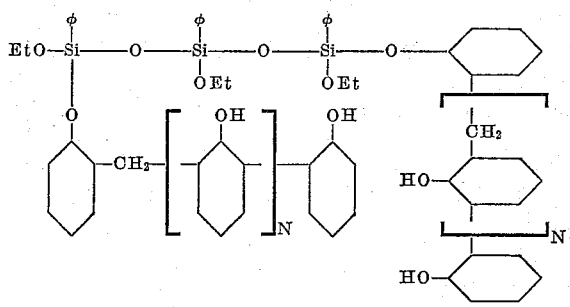

was the reaction product of a dihydric phenol with a poly (phenylethoxy siloxane).

The arsenic trisulfide was of commercial grade and the aluminum powder had an average particle size of approximately 18 microns.

After mixing, the adhesive was applied to 112–112 glass fabric to a uniform thickness of approximately 20 to 30 mils. A strip of the resin impregnated fabric was then placed between two strips of degreased stainless steel and cured at 75 p.s.i. for three hours at 600° F.

Several such test samples were similarly obtained and the bonded strips were placed in a circulating air oven heated to various temperatures for various times, removed, and tested for tensile shear strength at the temperature at which they were aged. The data obtained thereby is illustrated in Table I.

*Table No. I*

TENSILE SHEAR TESTED AT VARIOUS TEMPERATURES AFTER HEAT AGING AT VARIOUS TEMPERATURES

| Temperature, °F | Time | Average Tensile Shear, p.s.i. |
|---|---|---|
| R.T. Control | | 2,306 |
| 500 | 250 hrs | 1,357 |
| 500 | 500 hrs | 943 |
| 500 | 750 hrs | 580 |
| 500 | 1,000 hrs | 468 |
| 700 | 10 mins | 731 |
| 700 | 30 mins | 763 |
| 700 | 60 mins | 777 |
| 900 | 10 mins | 1,064 |
| 900 | 30 mins | 1,033 |
| 900 | 60 mins | 1,017 |
| 1,000 | 10 mins | 555 |

It has been further determined that in certain instances an improved curable resin system can be obtained by incorporating with the arsenic trisulfide curing agent not more than 50 parts by weight arsenic trioxide per 100 parts total curing agent employed. The principal advantage found in the use of arsenic trioxide is that there is thereby obtained a more complete cure. When arsenic trioxide is used in combination with arsenic trisulfide as a curing agent it is believed that the resulting polymeric material is a combination of the polyether and polythioether as is suspected to be the case when less than stoichiometric amounts of arsenic trisulfide alone are used as the curing agent.

EXAMPLE II

The adhesive formulation set forth in Example I was duplicated except that the curing agent consisted of 5 parts arsenic trisulfide and 5 parts arsenic trioxide. After thorough mixing at room temperature, the adhesive was applied to a 112–112 glass fabric and used to bond test strips of degreased stainless steel. The bond was obtained by curing at 75 p.s.i. for 3 hours at 600° F. The test samples were placed in a circulating air oven heated at 500° F. for various times, removed and tested for tensile shear strength at 500° F. The data obtained is illustrated in Table II.

*Table No. II*

TENSILE SHEAR AT 500° F. AFTER HEATING AT 500° F.

| Time at 500° F., hrs. | Tensile Shear, p.s.i. at 500° F. |
|---|---|
| 250 | 1,390 |
| 250 | 980 |
| 250 | 1,080 |
| 250 | 1,150 |
| Average | 1,150 |
| 500 | 672 |
| 500 | 958 |
| 500 | 792 |
| 500 | 686 |
| Average | 777 |
| 750 | 740 |
| 750 | 600 |
| 750 | 916 |
| 750 | 822 |
| Average | 770 |
| 1,000 | 828 |
| 1,000 | 596 |
| 1,000 | 752 |
| 1,000 | 650 |
| Average | 707 |

The arsenic trisulfide cured epoxy resin is extremely oxidation resistant at high temperatures. This resin system therefore is highly useful as a sealing composition.

EXAMPLE III

One hundred parts of the epoxy novolak of Example I were thoroughly mixed with 32 parts arsenic trisulfide having a particle size of 100 mesh. Mixing was conducted at 150° F. until the composition was uniform. This resin mixture was then milled with 132 parts by weight glass flake fines on a two roll rubber mill at room temperature, having a nip setting of 0.025 inch. A part of this sealing composition was then set aside and stored at 40° F. for ninety days. A further part of this composition was used to fabricate butt joint overlap test specimens having a three inch overlap using an epoxy-phenolic adhesive to form the bonds. The test specimens were formed from laminates made from 181 glass fabric using silicone modified phenolic resin as the binder. After complete curing had been obtained, the test specimens were cut in half, one half serving as the control and the other half being sealed with the sealing composition along all the exposed adhesive bond edges. Both the control and test specimens were then exposed to circulating air for 200 hours at 550° F. and examined.

After such exposure the unsealed control specimens had fallen apart, the bond strength of the adhesive having been destroyed. The test specimens were still bonded and were sawed into one inch wide test specimens and the tensile shear strength of the specimens determined at 550° F. Test of the controls at room temperature showed a joint strength in pounds per inch of width of 1210. The test specimens, after 200 hours at 550° F. gave a joint strength of 1268 pounds per inch of width based on the average of eight specimens tested. The material which had been stored for ninety days was tested as a sealant in a similar manner as set forth above and showed comparable sealing characteristics.

The above formulation may also be used as an adhesive and a wide variety of fillers may be used in place of glass flake, the only limitation thereon being that the filler should be nonreactive with the components of the adhesive at the temperatures to which the adhesive will be subjected.

EXAMPLE IV

One hundred parts of the epoxy novolak of Example I and 32.0 parts of arsenic trisulfide were mixed as in Example III, and 132.0 parts of aluminum powder (average particle size 18 microns) were milled into the resulting mixture on a rubber mill as in Example III. This composition was used as an adhesive to bond the laminates used in Example III and test and control specimens were prepared in the same manner. After 200 hours at 550° F. the joint strength of the test samples was 1125 pounds per inch of width compared to 1520 for the same joint after 15 minutes at 550° F.

The arsenic trisulfide was used to cure a variety of other epoxy resins in addition to those of epoxy novolak type shown above and proved to be equally effective in all cases. For example, the epoxy resins derived from either the reaction of peracids and polyolefines or from the condensation products of epoxyhalohydrins with polyhydric phenols may be similarly cured, as shown by the following:

EXAMPLE V

One hundred parts 3,4-epoxy-6-methyl cyclo-hexylmethyl-3,4-epoxy-6-methyl cyclohexane carboxylate (derived from the reaction of a peracid with the corresponding diolefine) and 30.0 parts arsenic trisulfide were thoroughly mixed and heated to 500° F. with stirring. The mixture cured to a hard, infusible mass in less than five minutes.

EXAMPLE VI

One hundred parts diglycidyl ether of 2,2-bis-(p-hydroxyphenyl) propane (derived from the reaction of epihalohydrin and 2,2-bis-(p-hydroxyphenol) propane) and 30.0 parts arsenic trisulfide were thoroughly mixed and heated at 350° F. with continuous stirring. After three minutes the mixture gelled to a hard, infusible mass.

Variations in the amounts of arsenic trisulfide in this resin system demonstrate that the by weight ratio of curing agent to resin may be varied over a wide range.

As stated above, the total amount of curing agent used should be in the range of from 10 to 35 parts by weight curing agent to 100 parts by weight resin in order to obtain a complete cure while at the same time retaining the full strength of the resin system. As further indicated above, up to 50 percent of the curing agent may be arsenic trioxide. In such latter cases it has been found that the completeness of the cure is improved, this being reflected in higher average tensile shear strengths after prolonged exposure to temperatures of 500° F., as shown by comparing Tables I and II above.

Having fully described my invention, it is to be understood that I do not wish to be limited to the details set forth, but my invention is of the full scope of the appended claims.

I claim:

1. A curable resin system comprising a polyepoxide containing an average of more than one oxirane group per molecule and arsenic trisulfide.

2. A curable resin system comprising a mixture of an uncured polyepoxide containing an average of more than one oxirane group per molecule and arsenic trisulfide, the amount of arsenic trisulfide in said mixture being in the range of from 10 to 35 parts by weight to 100 parts polyepoxide.

3. A curable resin system comprising a mixture of an uncured polyepoxide containing an average of more than one oxirane group per molecule and a curing agent, said curing agent being selected from the group consisting of arsenic trisulfide and mixtures of arsenic trisulfide and arsenic trioxide, the by weight amount of arsenic trioxide in said latter mixture being not more than 50 percent of the total by weight amount of curing agent used.

4. A curable resin system comprising an uncured polyepoxide containing an average of more than one oxirane group per molecule and a curing agent, said curing agent being a mixture of arsenic trisulfide and not more than 50 parts by weight arsenic trioxide per 100 parts by weight curing agent, the weight ratio of curing agent to polyepoxide being in the range of from 10:100 to 35:100.

5. A curable resin system comprising a substantially homogeneous mixture of an uncured polyepoxide containing an average of more than one oxirane group per molecule, arsenic trisulfide and a filler, said filler being a comminuted material which is nonreactive in said system at the temperatures to which the system is exposed.

6. A curable resin system as claimed in claim 5 wherein the filler is glass flake.

7. A curable resin system as claimed in claim 5 wherein the filler is aluminum powder.

8. A curable resin system comprising a substantially homogeneous mixture of a polyepoxide containing an average of more than one oxirane group per molecule, the reaction product of a dihydric phenol and a poly (phenylethoxy siloxane), a curing agent and a filler, said curing agent comprising arsenic trisulfide and said filler being a comminuted material which is nonreactive in said system at the temperatures to which the system is exposed.

9. A curable resin system consisting essentially of a mixture of 100 parts by weight epoxy novolak, 30–35 parts by weight silicone-phenolic condensation product, 5 parts by weight arsenic trisulfide, 5 parts by weight arsenic trioxide and 125–130 parts by weight aluminum powder.

10. A curable resin system as claimed in claim 9 wherein said mixture is uniformly coated on a glass fabric carrier to a thickness of 10–20 mils.

11. A cured resin system comprising the reaction product of a polyepoxide containing an average of more than one oxirane group per molecule and arsenic trisulfide.

12. A cured resin system comprising the reaction product of a polyepoxide containing an average of more than one oxirane group per molecule and a curing agent, said curing agent being a mixture of arsenic trisulfide and not more than 50 parts by weight arsenic trioxide per 100 parts by weight curing agent.

13. A process of forming a cured resin which comprises: treating a polyepoxide containing an average of more than one oxirane group per molecule with arsenic trisulfide at a temperature sufficient to effect curing of the polyepoxide.

14. A process of forming a cured resin which comprises: treating 100 parts by weight of a polyepoxide containing an average of more than one oxirane group per molecule with from 10 to 35 parts by weight arsenic trisulfide at a temperature sufficient to effect curing of the polyepoxide.

References Cited in the file of this patent

UNITED STATES PATENTS 3,014,893     Susman et al.     Dec. 26, 1961